(12) United States Patent
Shi et al.

(10) Patent No.: US 10,675,977 B1
(45) Date of Patent: Jun. 9, 2020

(54) VEHICLE INTEGRATED COMPUTER

(71) Applicant: Indiev, Inc, Los Angeles, CA (US)

(72) Inventors: Hai Shi, Los Angeles, CA (US); Alejandro Portabales, Los Angeles, CA (US); Hojeong Kim, Los Angeles, CA (US); Young Joon Ju, Los Angeles, CA (US)

(73) Assignee: INDIEV, INC, Los Angeles, CA (US)

( * ) Notice: Subject to any disclaimer, the term of this patent is extended or adjusted under 35 U.S.C. 154(b) by 0 days.

(21) Appl. No.: 16/298,321

(22) Filed: Mar. 11, 2019

(51) Int. Cl.
*B60K 35/00* (2006.01)
*B60R 16/023* (2006.01)
*G06F 9/455* (2018.01)

(52) U.S. Cl.
CPC ............ *B60K 35/00* (2013.01); *B60R 16/023* (2013.01); *G06F 9/45533* (2013.01); *B60K 2370/151* (2019.05); *B60K 2370/589* (2019.05)

(58) Field of Classification Search
None
See application file for complete search history.

(56) References Cited

U.S. PATENT DOCUMENTS

| | | | | |
|---|---|---|---|---|
| 6,630,901 B1 * | 10/2003 | Winter | ........................ | H01Q 1/02 342/175 |
| 8,760,846 B1 * | 6/2014 | Snyder | ................... | H01G 11/26 361/326 |
| 2002/0110507 A1 * | 8/2002 | Grieve | ................. | B01J 19/0093 422/199 |
| 2004/0100750 A1 * | 5/2004 | Shigeta | ................... | H03K 17/16 361/118 |
| 2006/0124761 A1 * | 6/2006 | Shank | ..................... | B05B 9/002 239/13 |
| 2014/0039705 A1 * | 2/2014 | Magini | ..................... | G05F 1/66 700/287 |
| 2015/0050623 A1 * | 2/2015 | Falash | ...................... | G09B 9/24 434/38 |
| 2017/0082648 A1 * | 3/2017 | Katginari | ............... | G01P 1/006 |
| 2017/0255581 A1 * | 9/2017 | Chan | ................... | G06F 13/4068 |
| 2018/0069544 A1 * | 3/2018 | Mauder | ............. | H03K 17/0822 |
| 2018/0189103 A1 * | 7/2018 | Teshler | ................... | G06F 21/50 |
| 2019/0184972 A1 * | 6/2019 | Kim | ..................... | B60W 30/192 |
| 2019/0259229 A1 * | 8/2019 | Link, II | .................. | B60R 25/24 |
| 2019/0273869 A1 * | 9/2019 | Ramalingam | ............. | B60R 1/00 |

* cited by examiner

*Primary Examiner* — Fekadeselassie Girma (74) *Attorney, Agent, or Firm* — Saliwanchik, Lloyd & Eisenschenk (57) ABSTRACT

An electric vehicle (EV) can include a VIC in operable communication with the EV main computer and the EV infotainment system. The VIC can include a processor, a memory in operable communication with the processor, and a computer-readable medium in operable communication with the processor and having software, such as a hypervisor, stored thereon. The VIC can be configured to have internet connectivity.

1 Claim, 5 Drawing Sheets

VEHICLE INTEGRATED COMPUTER

BACKGROUND

Use of electric vehicles is becoming more common, as consumers seek out vehicle options that are more environmentally friendly and cost-effective to power. While many vehicles, electric or otherwise, have a computer, such computers are not easily accessible by the driver and are just used for repair diagnostics and/or vehicle locomotion. Drivers and passengers rely on their own smartphones, tablets, or laptops for robust entertainment options with internet connectivity within a vehicle.

BRIEF SUMMARY

Embodiments of the subject invention provide novel and advantageous vehicle integrated computers (VICs) for electric vehicles (EVs), as well as EVs comprising such VICs, and methods of using such VICs. A VIC can include computer hardware and software and be configured to connect to, and receive data from, other elements in the EV. For example, the VIC can be configured to connect to the EV main computer (i.e., the computer that controls locomotion of the EV) and an infotainment (entertainment and information) system of the EV. The VIC can also be configured to connect to, and receive data from, one or more sensors of the EV. Such sensors can include, but are not necessarily limited to, one or more of the following: a gyroscope; an accelerometer; a compass; a temperature sensor; and a light sensor. The VIC is configured to (and therefore capable of doing so) collect data from the other elements in the EV, such as the EV main computer, the infotainment system, and the one or more sensors. The VIC is further configured to (and therefore capable of doing so) perform data processing and provide outputs (e.g., visual, audio, and/or via a display connected to and in operable communication with the VIC) in real time. In this context, the term real time refers to a maximum delay that is imperceptible by the human users (e.g., driver and/or passenger(s)) of the VIC.

In an embodiment, an EV can comprise: an EV main computer that controls locomotion of the EV; an infotainment system; and a VIC in operable communication with the EV main computer and the infotainment system. The VIC can comprise: a processor; a memory in operable communication with the processor; and a computer-readable medium in operable communication with the processor and optionally having a hypervisor stored thereon. The VIC can be configured to have internet connectivity.

In another embodiment, a VIC can comprise: a processor; a memory in operable communication with the processor; and a computer-readable medium in operable communication with the processor and having a hypervisor stored thereon. The VIC can be configured to have internet connectivity, and the hypervisor can run and manage a plurality of operating systems (OSs). The VIC can be configured to operate without failing within an ambient temperature range of from −25° C. to 80° C.

DETAILED DESCRIPTION

Embodiments of the subject invention provide novel and advantageous vehicle integrated computers (VICs) for electric vehicles (EVs), as well as EVs comprising such VICs, and methods of using such VICs. A VIC can include computer hardware and software and be configured to connect to, and receive data from, other elements in the EV. For example, the VIC can be configured to connect to the EV main computer (i.e., the computer that controls operations (e.g., operating states, including but not limited to locomotion) of the EV) and an infotainment (entertainment and information) system of the EV. The VIC can also be configured to connect to, and receive data from, one or more sensors of the EV. Such sensors can include, but are not necessarily limited to, one or more of the following: a gyroscope; an accelerometer; a compass; a temperature sensor; and a light sensor. The VIC is configured to (and therefore capable of doing so) collect data from the other elements in the EV, such as the EV main computer, the infotainment system, and the one or more sensors. The VIC is further configured to (and therefore capable of doing so) perform data processing and provide outputs (e.g., visual, audio, and/or via a display connected to and in operable communication with the VIC) in real time. In this context, the term real time refers to a maximum delay that is imperceptible by the human users (e.g., driver and/or passenger(s)) of the VIC.

The VIC is a high-power computer that is configured to operate in an automotive environment. That is, the VIC is configured to operate without failing at least within an ambient temperature range of −25° C. to 80° C. The VIC is also configured to operate without failing in an environment that is subject to the mechanical shocks and vibrations that are associated with an EV in operation on the road.

Figure 1:
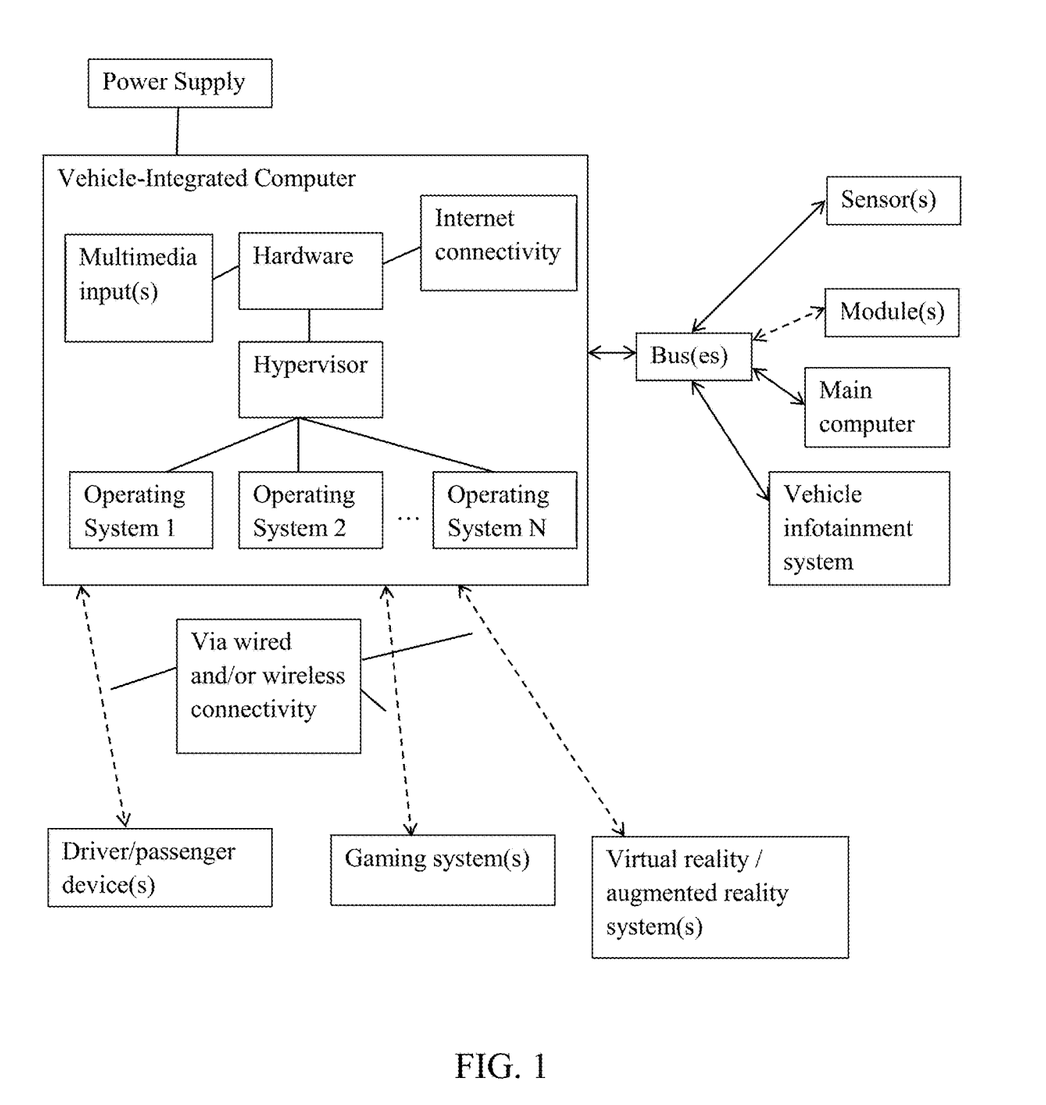
FIG. 1 shows a block diagram of a vehicle integrated computer (VIC) according to an embodiment of the subject invention.

FIG. 1 shows a block diagram of a VIC according to an embodiment of the subject invention. Referring to FIG. 1, the VIC includes computer hardware, which can optionally have a hypervisor installed thereon. The computer hardware includes typical computer components necessary to perform the VIC tasks enumerated herein; for example, the hardware can include a processor, memory, and a computer-readable medium such as a hard disk drive, solid state drive, or the like. A hypervisor, which can also be referred to as a virtual machine monitor (VMM) is computer software that creates and runs virtual machines. The hypervisor software runs at the base level and runs and manages virtual machines each having its own operating system (OS) for a specific purpose. These are depicted in FIG. 1 as operating system 1 through operating system N, and there is no set amount of OSs that can be run by the hypervisor. For example, the hypervisor can run one OS dedicated to gaming, one OS dedicated to music, and/or one OS dedicated to virtual reality/augmented reality (VR/AR). The hypervisor can also run one OS dedicated to at least two of gaming, music, and VR/AR, and a second (and possibly third, etc.) OS can also be run dedicated to other functions.

The VIC is configured to connect to, and receive data from, other elements in the EV, such as the EV main computer, the infotainment system, and one or more sensors. The VIC can also be configured to connect to, and receive data from, one or more additional modules that may be present in the EV, and the dotted line in FIG. 1 pointing to the module(s) block indicates that this is optional in many embodiments. The VIC is configured to connect to these other elements via one or more buses, and any combination of buses for connection can be used. For example, the VIC can connect to each separate element via a respective separate bus, or one single bus can be used to connect the VIC to all separate elements, or multiple buses can be used for connection with one or more buses connecting to multiple separate elements (e.g., one bus connecting to two separate elements and a second bus connecting to a single separate element, etc.). Each bus can be, for example, a controller area network (CAN) bus. Though the bus(es) block in FIG. 1 is depicted as separate from the VIC, the bus(es) can be considered either part of the VIC or a separate element of the VIC. For example, the bus(es) can be considered part of the VIC hardware or can be physically separate therefrom and communicate therewith.

The advanced processing capability in the VIC (via, e.g., a fast and powerful processor) can be used to compute complex operations and/or process high volumes of data at a high rate of speed (e.g., at a minimum, faster than the EV main computer and the infotainment system is capable of) in support of operation of the EV. For example, the VIC can be used for overlaying graphics data and transferring the completed frame to a display (e.g., a central interactive display (CID) that is also used for the infotainment system) and/or cluster.

The VIC can be connected to a power supply located within the EV, and the power supply can be for example a 12-Volt (12V) power supply or a power supply of at least 12 V. The VIC can have access to power at all times via the attached power supply. The VIC operating mode can depend on the vehicle state, and the operating modes can include accessory, ignition on, ready mode, and plugged in. The VIC will draw differing amounts of power from the power supply depending on the operating mode.

The VIC can also have at least one multimedia input; examples include but are not limited to high-definition multimedia interface (HDMI) and universal serial bus (USB). These inputs can be used to receive input from a connected external device, such as a gaming system (e.g., Xbox®, Sony PlayStation®, Nintendo Switch®), a VR/AR system, and/or a user (e.g., driver and/or passenger) device such as a smartphone, table, or laptop. Such external devices can also connect to the VIC via wireless connectivity. The VIC can include WiFi functionality, Bluetooth® functionality, and/or other types of wireless functionality. The optional connection with external devices is depicted in FIG. 1 using dashed lines.

The VIC can also have internet connectivity. For example, the VIC can include internet (e.g., 5G) connectivity by using an internet modem (e.g., a standard 5G modem) included as part of, or in direct connection with, the VIC computer hardware. The VIC can also be configured, either in addition to the built-in internet connectivity or as an alternative thereto, to connect to the internet via tethering to a mobile device (e.g., a user smartphone connected to the VIC) and/or via a WiFi network using the VIC WiFi functionality.

The VIC hardware can be located in any reasonable location within the EV. For example, the VIC hardware can be located within a panel, such as a rear right quarter panel or a rear left quarter panel of the EV. The VIC hardware can also be located in the dashboard (e.g., near a glove compartment area).

Figure 2:
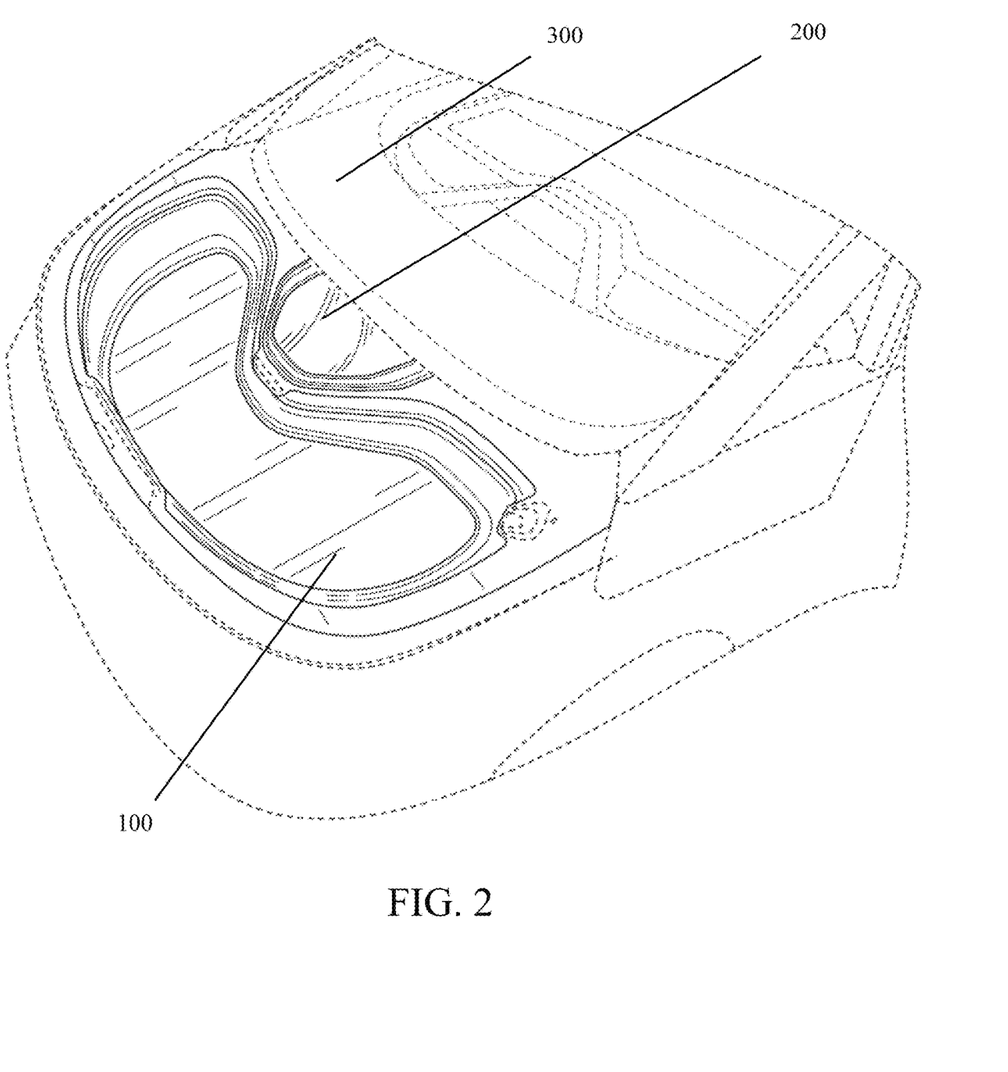
FIG. 2 shows a perspective view of a front-end of an electric vehicle (EV) having a VIC according to an embodiment of the subject invention.
Figure 3:
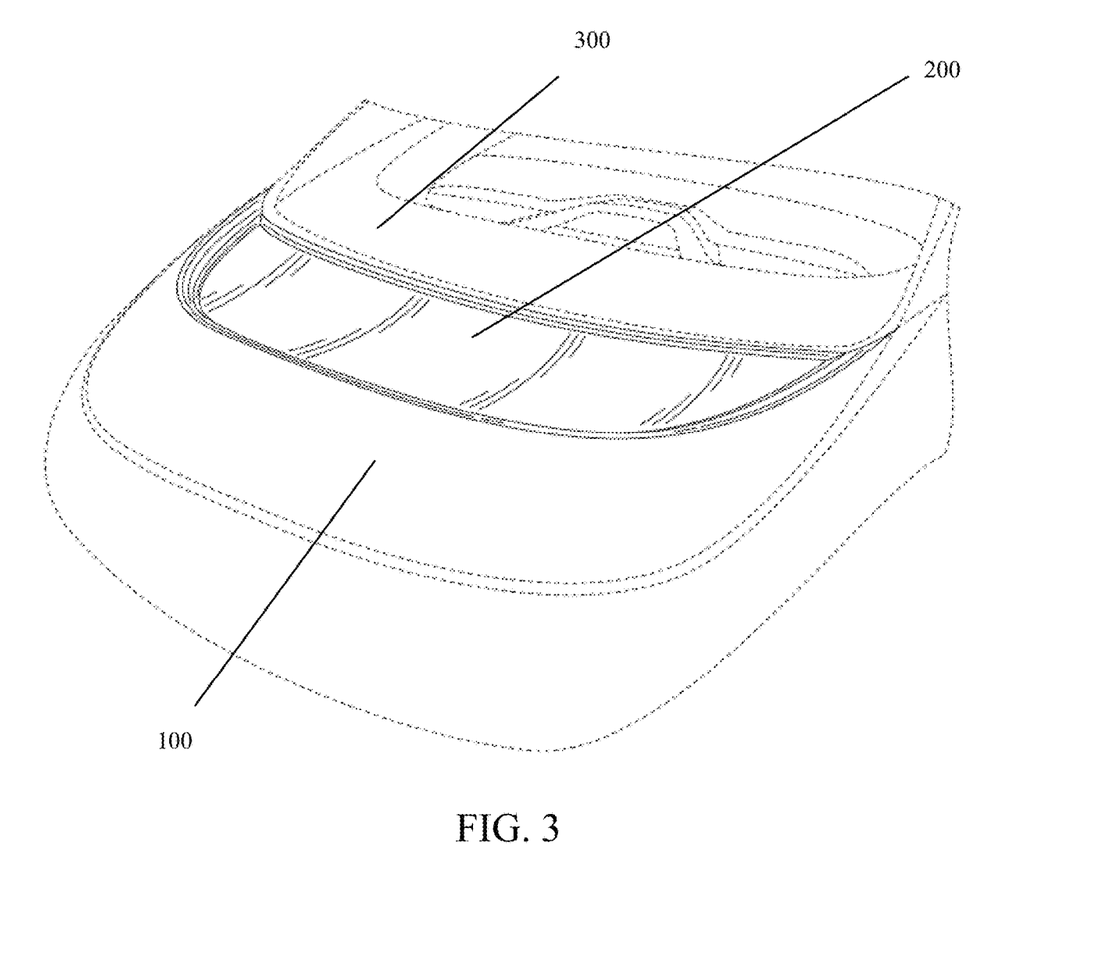
FIG. 3 shows a perspective view of a front-end of an EV having a VIC according to an embodiment of the subject invention.
Figure 4:
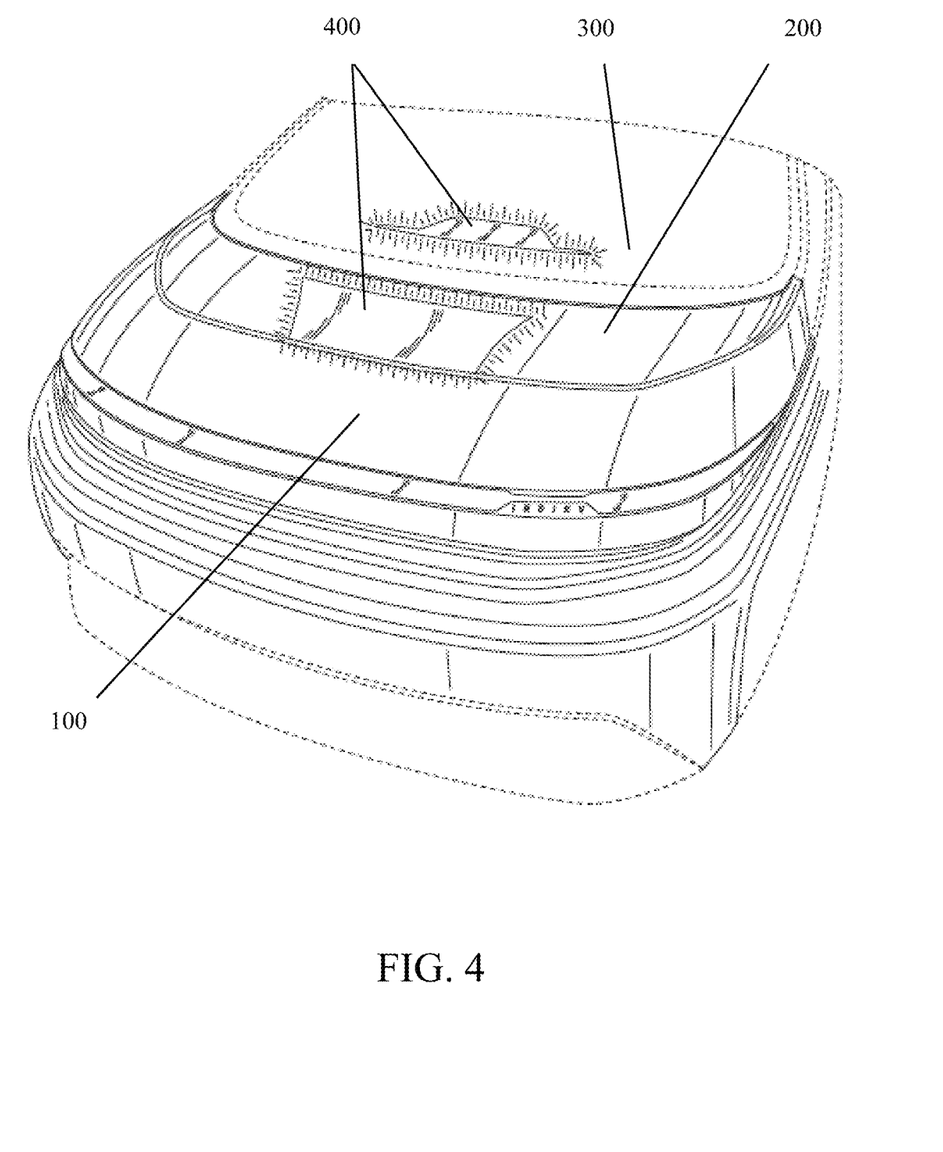
FIG. 4 shows a perspective view of a front-end of an EV having a VIC according to an embodiment of the subject invention.
Figure 5:
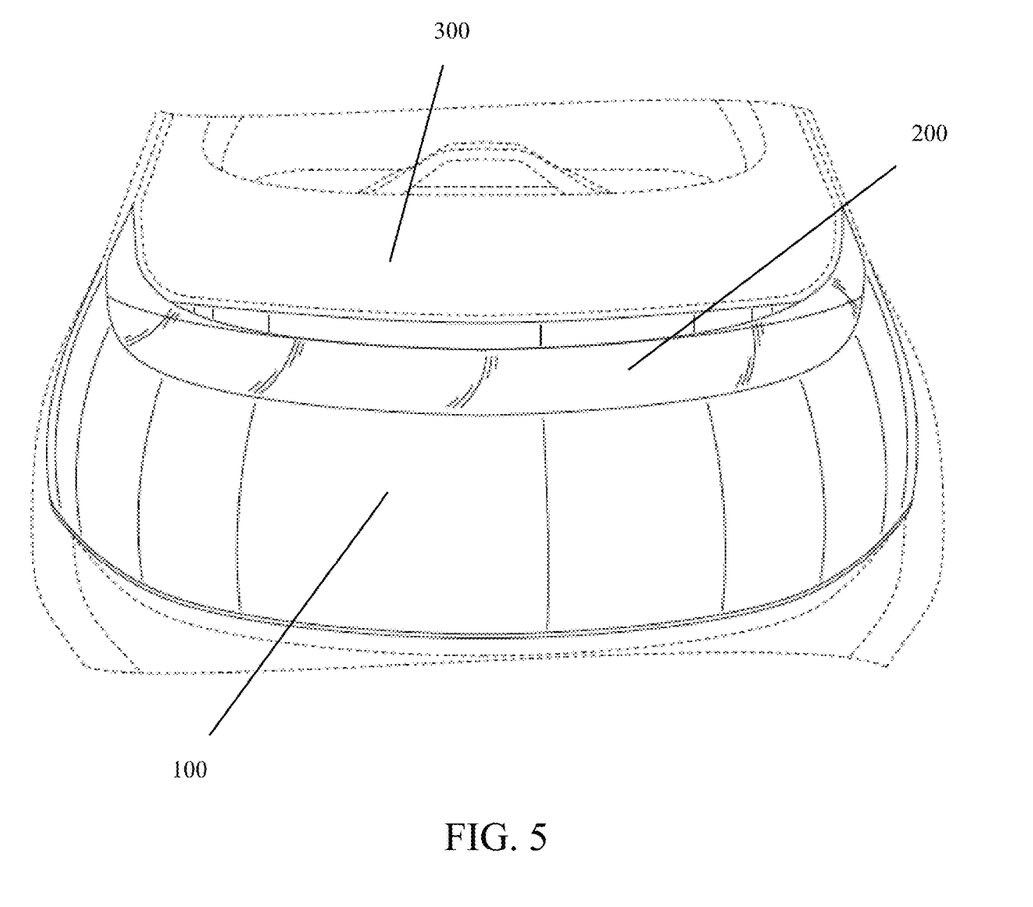
FIG. 5 shows a perspective view of a front-end of an EV having a VIC according to an embodiment of the subject invention.

FIGS. 2-5 show perspective views of the front portions of EVs having a VIC. These figures show other possible locations for the VIC hardware. Referring to FIG. 2, the VIC hardware can be located within a compartment 200 disposed near the front storage area 100. The VIC hardware can be completely between the front storage area 100 and the dashboard area 300 or it can extend such that a portion of it is located under or within the dashboard area 300. The compartment 200 can have a transparent upper portion (e.g., made of glass or a transparent polymer), and the compartment 200 can extend to the dashboard area 300 and possibly include a second transparent upper portion (e.g., made of glass or a transparent polymer) that is within the interior of the EV. FIG. 1 depicts the interior of the front storage area 100 of the EV. FIGS. 3-5 show other examples of compartments 200 that can house the VIC hardware, and in each of these figures the interior of the front storage area 100 is not shown because the hood is down. FIG. 4 shows an example where the compartment 200 extends to the dashboard area 300 and includes a transparent upper portion within the interior of the EV; FIG. 4 also shows that lights may shine through certain sections 400 of the compartment 200.

The VIC can be configured to allow users (e.g., driver(s) and passenger(s)) to enjoy music, pictures, games, and other media. This can be accomplished multiple ways. For example, a user can connect a user device (e.g., a phone, tablet, or laptop) directly to the VIC using a multimedia input, Bluetooth, and/or WiFi. The VIC can also accept media via its direct internet connection. The VIC can be configured to accept high definition (e.g., 1080p, 4K, 8K) video input from a gaming system (e.g., Xbox®, Sony PlayStation®, Nintendo Switch®) and generate video output(s) to one or more displays within the EV. The VIC can be configured to be able to rescale the input video to the proper resolution for the display(s) within the EV. Such display(s) within the EV can include a CID that is also used for the infotainment system. It should be noted that current regulations in the U.S. allow moving images to be displayed in a roadworthy vehicle only when the vehicle is not in motion/driving or if the moving images are not visible from the point of view of the driver of the vehicle. Thus, while the VIC can have the capability to allow a driver to enjoy music, pictures, games, and other media, the VIC can be configured to only allow this (to be enjoyed from the driver's point of view) while the vehicle is not in motion.

In many embodiments, the VIC is configured to receive global positioning satellite (GPS) information about the location of the EV from another element of the EV, such as from the infotainment system. In alternative embodiments, the VIC can have GPS capability itself so that it is configured to generate GPS information about the location of the EV.

The VIC can communicate with a remote central server (e.g., via internet connectivity). The VIC can also receive data via input from an application (i.e., mobile "app") on a user mobile device (e.g., smartphone, tablet). A user can enter preferences for the EV (e.g., seat position, air conditioner setting, audio settings, etc.) via an app or even by entering using an input element in the EV (e.g., a CID or other display, a keyboard connected to the VIC hardware, or via other input means). User preferences can be stored, either in local memory of the VIC (or in memory of another EV element in operable communication with the VIC hardware) and/or on the remote central server. The VIC can allow user profile selection and/or automatic detection via a key fob or similar electronic device carried on the person of a user. The user preferences can be password-protected (e.g., via a username and password on the app and/or on the VIC), though this is not required. Because user preferences can be stored on a remote central server, user preferences can be used in multiple EVs (e.g., a user can borrow a friend's EV that also has a VIC as disclosed herein, and can have his or her user preferences be applied to the friend's EV, either by entering information or by automatic detection via a key fob or similar electronic device).

As discussed herein, the VIC can receive input via many different ways. For example, the VIC can receive input from a touch screen display (e.g., a CID that may also be used for the infotainment system), a mobile app, an external multimedia input, and via one or more buses (e.g., CAN buses) connected at least to the EV main computer and the infotainment system (as well as optionally one or more sensors and/or additional modules within the EV).

The VIC can have translation software installed thereon (e.g., on one of the OSs or as its own OS) or can be in operable communication with another element (e.g., a user device or the infotainment system) having translation software, so that a user can communicate with a person using a different language (e.g., a user can have a video conference with someone speaking a language that the user does not speak).

VICs according to embodiments of the subject invention are computers configured to handle instant video streaming, gaming, and 3D software, while functioning independently of the EV main computer and the infotainment system while also being configured to exchange data with the EV main computer and the infotainment system. In many embodiments, the VIC can be accessed through the infotainment system controls and display (e.g., a touchscreen CID). The VIC allows users to share media (e.g., music, pictures, gaming) with other users (either in the same EV or even in a different EV via a network connection). The VIC also allows for streaming of high definition video and video conferences within the EV. The VIC further allows users to enjoy VR/AR gaming within the environment of the EV, and users can enjoy streaming media (e.g., Netflix®, Hulu®) while the EV is moving or parked. The VIC can be used as an extension of a home computer or work computer and allow users to continue working from within the EV while the EV is moving or parked. The VIC also allows for a gaming system to be attached and/or integrated so it can be played by users within the EV while the EV is moving or parked. Internet connectivity and access (e.g., via a standard 5G modem) opens up a multitude of functionalities on the VIC. It should be noted again that current regulations in the U.S. allow moving images to be displayed in a roadworthy vehicle only when the vehicle is not in motion/driving or if the moving images are not visible from the point of view of the driver of the vehicle. Thus, while the VIC can have the capability to allow a driver to enjoy music, pictures, games, and other media, the VIC can be configured to only allow this (to be enjoyed from the driver's point of view) while the vehicle is not in motion. VICs according to embodiments of the subject invention provide a living-room-type experience for users within the EV while the EV is parked or even while it is moving (particularly for passenger users while the EV is moving; again, the VIC can be configured to only allow this (from the driver's point of view) while the vehicle is not in motion). The VIC can help minimize cancellations of personal trips or vacations due to last minute work requests because users can continue to work and satisfy such a request via the VIC even while traveling in the EV. The VIC can make long trips more pleasant for all passengers, particularly children, by providing engaging gaming, video, and other media streaming while the EV is moving or parked. The VIC can allow users to easily learn about music, places and things to do in the local area where the EV currently is located, and activities of other EV users (e.g., music being listened to and/or locations of the EV for other users of different EVs having a VIC as described herein, if such users have made such information accessible by some or all other users).

Embodiments of the subject invention also include methods of using a VIC and/or EV as described herein. Such methods include using a VIC and/or EV according to their intended purposes as described herein.

The methods, systems, and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals (i.e., computer-readable media can be referred to as non-transitory). A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A vehicle-integrated computer (VIC), comprising:
a processor;
a memory in operable communication with the processor; and
a computer-readable medium in operable communication with the processor and having software (e.g., a hypervisor) stored thereon.

Embodiment 2

The VIC according to embodiment 1, wherein the VIC is configured to have internet connectivity.

Embodiment 3

The VIC according to embodiment 2, wherein the internet connectivity is provided via one or more of an internet modem (e.g., a 5G modem), WiFi connectivity, and tethering to an external mobile device (e.g., a smartphone, tablet, or laptop computer).

Embodiment 4

The VIC according to embodiment 1, further comprising a 5G modem in operable communication with the processor.

Embodiment 5

The VIC according to any of embodiments 1-4, wherein the VIC is configured to operate without failing within an ambient temperature range of from −25° C. to 80° C.

Embodiment 6

The VIC according to any of embodiments 1-5, wherein the VIC is configured to operate without failing when subjected to mechanical shocks and vibrations that are associated with an electric vehicle driving on a road.

Embodiment 7

The VIC according to any of embodiments 1-6, wherein the software comprises a hypervisor that runs and manages a plurality of operating systems (OSs).

Embodiment 8

The VIC according to embodiment 7, wherein the plurality of OSs comprises a first OS dedicated to gaming.

Embodiment 9

The VIC according to embodiment 8, wherein the first OS is also dedicated to at least one of music, virtual reality (VR), and/or augmented reality (AR).

Embodiment 10

The VIC according to any of embodiments 7-9, wherein the plurality of OSs comprises a second OS dedicated to at least one of music, VR, and/or AR.

Embodiment 11

The VIC according to any of embodiments 1-10, wherein the VIC is configured to exchange data with a vehicle main computer.

Embodiment 12

The VIC according to embodiment any of embodiments 1-11, wherein the VIC is configured to exchange data with a vehicle infotainment system.

Embodiment 13

The VIC according to any of embodiments 1-12, wherein the VIC is configured to exchange data with at least one vehicle sensor.

Embodiment 14

The VIC according to embodiment 13, wherein the at least one vehicle sensor comprises at least one of a gyroscope, an accelerometer, a compass, a temperature sensor, and a light sensor.

Embodiment 15

The VIC according to embodiment 13, wherein the at least one vehicle sensor comprises at least two of a gyroscope, an accelerometer, a compass, a temperature sensor, and a light sensor.

Embodiment 16

The VIC according to embodiment 13, wherein the at least one vehicle sensor comprises at least three of a gyroscope, an accelerometer, a compass, a temperature sensor, and a light sensor.

Embodiment 17

The VIC according to embodiment 13, wherein the at least one vehicle sensor comprises at least four of a gyroscope, an accelerometer, a compass, a temperature sensor, and a light sensor.

Embodiment 18

The VIC according to embodiment 13, wherein the at least one vehicle sensor comprises a gyroscope, an accelerometer, a compass, a temperature sensor, and a light sensor.

Embodiment 19

The VIC according to any of embodiments 11-18, further comprising at least one bus (e.g., controller area network (CAN) bus) via which the VIC communicates with at least one of the vehicle main computer, the vehicle infotainment system (if present), and the at least one vehicle sensor (if present).

Embodiment 20

The VIC according to any of embodiments 11-18, further comprising a bus (e.g., CAN bus) via which the VIC communicates with the vehicle main computer, the vehicle infotainment system (if present), and the at least one vehicle sensor (if present).

Embodiment 21

The VIC according to any of embodiments 11-18, further comprising a first bus (e.g., CAN bus) via which the VIC communicates with the vehicle main computer.

Embodiment 22

The VIC according to any of embodiments 11-18 and 21, further comprising a second bus (e.g., CAN bus) via which the VIC communicates with the vehicle infotainment system.

Embodiment 23

The VIC according to any of embodiments 11-18 and 21-22, further comprising a third bus (e.g., CAN bus) via which the VIC communicates with the at least one vehicle sensor.

Embodiment 24

The VIC according to any of embodiments 11-18, further comprising at least one bus (e.g., CAN bus) via which the VIC communicates with at least one external element within an electric vehicle.

Embodiment 25

The VIC according to any of embodiments 1-24, wherein the VIC is configured to perform data processing and provide output (e.g., visual and/or audio output) in real time.

Embodiment 26

The VIC according to any of embodiments 1-25, wherein the VIC is configured to connect to, and receive power from, an external power supply.

Embodiment 27

The VIC according to embodiment 26, wherein the external power supply is a 12V power supply.

Embodiment 28

The VIC according to embodiment 26, wherein the external power supply is a power supply of at least 12 V.

Embodiment 29

The VIC according to any of embodiments 1-25, further comprising a power supply that powers the VIC.

Embodiment 30

The VIC according to embodiment 29, wherein the power supply is a 12V power supply.

Embodiment 31

The VIC according to embodiment 29, wherein the power supply is a power supply of at least 12 V.

Embodiment 32

The VIC according to any of embodiments 1-31, wherein the VIC draws power from a (the) power supply based on a current operating mode from among a plurality of operating modes.

Embodiment 33

The VIC according to embodiment 32, wherein the plurality of operating modes comprises accessory, ignition on, ready mode, and plugged in.

Embodiment 34

The VIC according to any of embodiments 1-33, further comprising at least one multimedia input (e.g., one or more HDMI inputs and/or one or more USB inputs).

Embodiment 35

The VIC according to any of embodiments 1-34, further comprising WiFi functionality.

Embodiment 36

The VIC according to any of embodiments 1-35, further comprising Bluetooth functionality.

Embodiment 37

The VIC according to any of embodiments 1-36, wherein the VIC is configured to receive GPS information about a location of the VIC from an external device.

Embodiment 38

The VIC according to embodiment 37, wherein the external device is a vehicle infotainment system.

Embodiment 39

The VIC according to any of embodiments 1-36, wherein the VIC is configured to generate GPS information about a location of the VIC.

Embodiment 40

The VIC according to any of embodiments 1-39, wherein the VIC is configured to communicate with a remote central server.

Embodiment 41

The VIC according to any of embodiments 1-40, wherein the VIC is configured to communicate with, and receive data from, a mobile application (mobile "app") on a user mobile device (e.g., smartphone, tablet).

Embodiment 42

The VIC according to embodiment 41, wherein the mobile application allows a user to enter user preferences for an EV, and wherein the data received by the VIC from the mobile application includes the user preferences.

Embodiment 43

The VIC according to embodiment 42, wherein the user preferences are stored in the memory of the VIC.

Embodiment 44

The VIC according to any of embodiments 42-43, wherein the user preferences are stored in a remote central server.

Embodiment 45

The VIC according to any of embodiments 42-44, wherein the VIC is configured to allow for automatic detection of the stored user preferences of a particular user based on detection of a key fob (or similar electronic device), which is linked to the particular user, being in a predetermined proximity to the EV in which the VIC is installed.

Embodiment 46

The VIC according to any of embodiments 1-45, wherein the VIC is configured to receive input via a touch screen display in operable communication with the VIC.

Embodiment 47

The VIC according to any of embodiments 1-46, wherein the VIC is configured to accept high definition (e.g., 1080p, 4K, 8K) video input from a gaming system (e.g., Xbox®, Sony PlayStation®, Nintendo Switch®) and generate at least one video output to one or more displays in operable communication with the VIC (e.g., one or more displays within an EV in which the VIC is installed).

Embodiment 48

The VIC according to embodiment 47, wherein the VIC is configured to be capable of rescaling the video input to the proper resolution for the one or more displays.

Embodiment 49

The VIC according to any of embodiments 47-48, wherein at least one of the one or more displays is a central interactive display (of an EV in which the VIC is installed).

Embodiment 50

The VIC according to any of embodiments 1-49, further comprising translation software (e.g., stored on the computer readable medium or stored on an external device in operable communication with the VIC).

Embodiment 51

The VIC according to any of embodiments 1-50, wherein the VIC is configured to handle instant video streaming, gaming, and 3D software.

Embodiment 52

An electric vehicle (EV) comprising the VIC according to any of embodiments 1-51.

Embodiment 53

The EV according to embodiment 52, further comprising an EV main computer that controls operations of the EV, the EV main computer being in operable communication with the VIC.

Embodiment 54

The EV according to any of embodiments 52-53, further comprising an infotainment system in operable communication with the VIC.

Embodiment 55

The VIC according to embodiment 54, wherein the VIC is configured to handle instant video streaming, gaming, and 3D software while functioning independent of the EV main computer and the infotainment system.

Embodiment 56

The EV according to any of embodiments 52-55, wherein the VIC is accessed through controls and a display (e.g., a control interactive display) of an infotainment system of the EV.

Embodiment 57

The EV according to any of embodiments 52-56, wherein the VIC is configured to stream high definition video and video conferences within the interior of the EV.

Embodiment 58

The EV according to any of embodiments 52-57, wherein the VIC is configured to allow a user of the EV to share media (e.g., music, pictures, gaming) with a user of a different EV.

Embodiment 59

The EV according to any of embodiments 52-58, wherein the VIC is configured to run VR/AR gaming within the interior of the EV while the EV is moving or parked.

Embodiment 60

The EV according to any of embodiments 52-59, wherein the VIC is configured to stream video within the interior of the EV while the EV is moving or parked.

Embodiment 61

The EV according to any of embodiments 52-58, wherein the VIC is configured to run a gaming system within the interior of the EV while the EV is moving or parked.

Embodiment 62

An electric vehicle (EV), comprising:
an EV main computer that controls operations of the EV;
an infotainment system; and
a vehicle-integrated computer (VIC) in operable communication with the EV main computer and the infotainment system,
  wherein the VIC comprises:
  a processor;
  a memory in operable communication with the processor; and
  a computer-readable medium in operable communication with the processor and having software (e.g., a hypervisor) stored thereon.

Embodiment 63

The EV according to embodiment 62, wherein the VIC is configured to have internet connectivity.

Embodiment 64

The EV according to embodiment 63, wherein the internet connectivity is provided via one or more of an internet modem (e.g., a 5G modem), WiFi connectivity, and tethering to an external mobile device (e.g., a smartphone, tablet, or laptop computer).

Embodiment 65

The EV according to embodiment 62, wherein the VIC further comprises a 5G modem in operable communication with the processor.

Embodiment 66

The EV according to any of embodiments 62-65, wherein the VIC is configured to operate without failing within an ambient temperature range of from −25° C. to 80° C.

Embodiment 67

The EV according to any of embodiments 62-66, wherein the VIC is configured to operate without failing when subjected to mechanical shocks and vibrations that are associated with an electric vehicle driving on a road.

Embodiment 68

The EV according to any of embodiments 62-67, wherein the software comprises a hypervisor that runs and manages a plurality of operating systems (OSs).

Embodiment 69

The EV according to embodiment 68, wherein the plurality of OSs comprises a first OS dedicated to gaming.

Embodiment 70

The EV according to embodiment 69, wherein the first OS is also dedicated to at least one of music, virtual reality (VR), and/or augmented reality (AR).

Embodiment 71

The EV according to any of embodiments 68-70, wherein the plurality of OSs comprises a second OS dedicated to at least one of music, VR, and/or AR.

Embodiment 72

The EV according to any of embodiments 62-71, wherein the VIC is configured to exchange data with the EV main computer.

Embodiment 73

The EV according to embodiment any of embodiments 62-72, wherein the VIC is configured to exchange data with the vehicle infotainment system.

Embodiment 74

The EV according to any of embodiments 62-73, further comprising at least one vehicle sensor in operable communication with the VIC, wherein the VIC is configured to exchange data with the at least one vehicle sensor.

Embodiment 75

The EV according to embodiment 74, wherein the at least one vehicle sensor comprises at least one of a gyroscope, an accelerometer, a compass, a temperature sensor, and a light sensor.

Embodiment 76

The EV according to embodiment 74, wherein the at least one vehicle sensor comprises at least two of a gyroscope, an accelerometer, a compass, a temperature sensor, and a light sensor.

Embodiment 77

The EV according to embodiment 74, wherein the at least one vehicle sensor comprises at least three of a gyroscope, an accelerometer, a compass, a temperature sensor, and a light sensor.

Embodiment 78

The EV according to embodiment 74, wherein the at least one vehicle sensor comprises at least four of a gyroscope, an accelerometer, a compass, a temperature sensor, and a light sensor.

Embodiment 79

The EV according to embodiment 74, wherein the at least one vehicle sensor comprises a gyroscope, an accelerometer, a compass, a temperature sensor, and a light sensor.

Embodiment 80

The EV according to any of embodiments 62-79, further comprising at least one bus (e.g., controller area network (CAN) bus) via which the VIC communicates with at least one of the EV main computer, the infotainment system, and the at least one vehicle sensor (if present).

Embodiment 81

The EV according to any of embodiments 62-79, further comprising a bus (e.g., CAN bus) via which the VIC communicates with the EV main computer, the infotainment system, and the at least one vehicle sensor (if present).

Embodiment 82

The EV according to any of embodiments 62-79, further comprising a first bus (e.g., CAN bus) via which the VIC communicates with the EV main computer.

Embodiment 83

The EV according to any of embodiments 62-79 and 82, further comprising a second bus (e.g., CAN bus) via which the VIC communicates with the infotainment system.

Embodiment 84

The EV according to any of embodiments 62-79 and 82-83, further comprising a third bus (e.g., CAN bus) via which the VIC communicates with the at least one vehicle sensor.

Embodiment 85

The EV according to any of embodiments 62-84, wherein the VIC is configured to perform data processing and provide output (e.g., visual and/or audio output) in real time.

Embodiment 86

The EV according to any of embodiments 62-85, further comprising a power supply configured to connect to, and provide power to, the VIC.

Embodiment 87

The EV according to embodiment 86, wherein the power supply is a 12V power supply.

Embodiment 88

The EV according to embodiment 86, wherein the external power supply is a power supply of at least 12 V.

Embodiment 89

The EV according to any of embodiments 62-88, wherein the VIC draws power from a (the) power supply based on a current operating mode from among a plurality of operating modes of the EV.

Embodiment 90

The EV according to embodiment 89, wherein the plurality of operating modes comprises accessory, ignition on, ready mode, and plugged in.

Embodiment 91

The EV according to any of embodiments 62-90, wherein the VIC further comprises at least one multimedia input (e.g., one or more HDMI inputs and/or one or more USB inputs).

Embodiment 92

The EV according to any of embodiments 62-91, wherein the VIC further comprises WiFi functionality.

Embodiment 93

The EV according to any of embodiments 62-92, wherein the VIC further comprises Bluetooth functionality.

Embodiment 94

The EV according to any of embodiments 62-93, wherein the VIC is configured to receive GPS information about a location of the EV from the infotainment system.

Embodiment 95

The EV according to any of embodiments 62-93, wherein the VIC is configured to generate GPS information about a location of the EV.

Embodiment 96

The EV according to any of embodiments 62-95, wherein the VIC is configured to communicate with a remote central server.

Embodiment 97

The EV according to any of embodiments 62-96, wherein the VIC is configured to communicate with, and receive data from, a mobile application (mobile "app") on a user mobile device (e.g., smartphone, tablet).

Embodiment 98

The EV according to embodiment 97, wherein the mobile application allows a user to enter user preferences for the EV, and wherein the data received by the VIC from the mobile application includes the user preferences.

Embodiment 99

The EV according to embodiment 98, wherein the user preferences are stored in the memory of the VIC.

Embodiment 100

The EV according to any of embodiments 98-99, wherein the user preferences are stored in a remote central server.

Embodiment 101

The EV according to any of embodiments 98-100, wherein the VIC is configured to allow for automatic detection of the stored user preferences of a particular user based on detection of a key fob (or similar electronic device), which is linked to the particular user, being in a predetermined proximity to the EV.

Embodiment 102

The EV according to any of embodiments 62-101, further comprising a touch screen display (e.g., a control interactive display) in operable communication with the VIC, wherein the VIC is configured to receive input via the touch screen display.

Embodiment 103

The EV according to any of embodiments 62-102, wherein the VIC is configured to accept high definition (e.g., 1080p, 4K, 8K) video input from a gaming system (e.g., Xbox®, Sony PlayStation®, Nintendo Switch®) and generate at least one video output to one or more displays in operable communication with the VIC and within the EV.

Embodiment 104

The EV according to embodiment 103, wherein the VIC is configured to be capable of rescaling the video input to the proper resolution for the one or more displays.

Embodiment 105

The EV according to any of embodiments 47-48, wherein at least one of the one or more displays is a central interactive display.

Embodiment 106

The EV according to any of embodiments 62-105, further comprising translation software (e.g., stored on the computer readable medium or stored on an external device in operable communication with the VIC).

Embodiment 107

The EV according to any of embodiments 52-106, wherein the VIC is disposed within a rear panel of the EV.

Embodiment 108

The EV according to any of embodiments 52-106, wherein the VIC is disposed within a rear right quarter panel of the EV.

Embodiment 109

The EV according to any of embodiments 52-106, wherein the VIC is disposed within a rear left quarter panel of the EV.

Embodiment 110

The EV according to any of embodiments 52-106, wherein the VIC is disposed in a dashboard of the EV.

Embodiment 111

The EV according to any of embodiments 52-106 and 110, wherein the VIC is disposed adjacent to a glove compartment area of the EV.

Embodiment 112

The EV according to any of embodiments 52-106, further comprising a front storage area forward of a dashboard area of the EV, wherein the VIC is disposed in a compartment adjacent to the front storage area, at least a portion of the compartment being disposed between the front storage area and the dashboard area.

Embodiment 113

The EV according to embodiment 112, wherein the VIC is disposed completely between the front storage area and the dashboard area.

Embodiment 114

The EV according to embodiment 112, wherein at least a portion of the VIC is disposed under or within the dashboard area.

Embodiment 115

The EV according to any of embodiments 112-114, wherein the compartment comprises a first transparent upper portion (e.g., made of glass or a transparent polymer).

Embodiment 116

The EV according to embodiment 115, wherein at least a portion of the compartment extends to the dashboard area.

Embodiment 117

The EV according to embodiment 116, wherein the compartment further comprises a second transparent upper portion (e.g., made of glass or a transparent polymer) within the dashboard area.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An electric vehicle (EV), comprising:
an EV main computer that controls operations of the EV;
an infotainment system;
at least one vehicle sensor, the at least one vehicle sensor comprising at least one of a gyroscope, an accelerometer, a compass, a temperature sensor, and a light sensor; and
a vehicle-integrated computer (VIC) in operable communication with the EV main computer, the infotainment system, and the at least one vehicle sensor,
wherein the VIC comprises:
    a processor;
    a memory in operable communication with the processor;
    a computer-readable medium in operable communication with the processor and having a hypervisor stored thereon; and
    a 5G modem in operable communication with the processor,
wherein the VIC is configured to have internet connectivity, the internet connectivity being provided by at least the 5G modem,
wherein the VIC is configured to have WiFi functionality,
wherein the VIC is configured to operate without failing within an ambient temperature range of from −25° C. to 80° C.,
wherein the hypervisor runs and manages a plurality of operating systems (OSs),
wherein the plurality of OSs comprises a first OS dedicated to gaming, music, and virtual reality (VR)/augmented reality (AR),
wherein the EV further comprises at least one controller area network (CAN) bus via which the VIC communicates with the EV main computer, the infotainment system, and the at least one vehicle sensor,
wherein the VIC is configured to perform data processing and provide visual and audio output in real time,
wherein the VIC is configured to communicate with a remote central server,
wherein the VIC is configured to communicate with, and receive data from, a mobile application on a user mobile device,
wherein the mobile application allows a user to enter user preferences for the EV, wherein the data received by the VIC from the mobile application includes the user preferences, wherein the user preferences are stored in at least one of the remote central server and the memory of the VIC, wherein the VIC is configured to allow for automatic detection of the stored user preferences of a particular user based on detection of a key fob, which is linked to the particular user, being in a predetermined proximity to the EV, wherein the VIC is configured to accept high definition video input from a gaming system and generate a video output to a central interactive display in operable communication with the VIC and disposed within the EV, and wherein the VIC is configured to be capable of resealing the high definition video input to the proper resolution for the central interactive display.

* * * * *